(12) United States Patent
Hendrickson

(10) Patent No.: US 7,531,606 B2
(45) Date of Patent: May 12, 2009

(54) METHOD FOR OPERATING A GAS PHASE POLYMERIZATION REACTOR

(75) Inventor: Gregory G. Hendrickson, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 656 days.

(21) Appl. No.: 10/854,345

(22) Filed: May 26, 2004

(65) Prior Publication Data

US 2005/0267268 A1    Dec. 1, 2005

(51) Int. Cl.
   *C08F 2/00*      (2006.01)
   *C08F 4/00*      (2006.01)
   *C08F 112/08*    (2006.01)

(52) U.S. Cl. .................. 526/68; 526/901; 526/348; 526/90

(58) Field of Classification Search .............. 526/68, 526/901, 348, 90
See application file for complete search history.

(56) References Cited

U.S. PATENT DOCUMENTS

| | | | |
|---|---|---|---|
| 3,779,712 A | 12/1973 | Calvert et al. | |
| 4,427,573 A | 1/1984 | Miles et al. | |
| 4,543,399 A | 9/1985 | Jenkins, III et al. | |
| 4,588,790 A * | 5/1986 | Jenkins et al. | ........... 526/70 |
| 4,628,034 A | 12/1986 | Hofferber | |
| 5,317,036 A | 5/1994 | Brady, III et al. | |
| 5,352,749 A | 10/1994 | DeChellis et al. | |
| 5,405,922 A | 4/1995 | DeChellis et al. | |
| 5,436,304 A | 7/1995 | Griffin et al. | |
| 5,462,999 A * | 10/1995 | Griffin et al. | .......... 526/68 |
| 6,391,985 B1 | 5/2002 | Goode et al. | |
| 6,455,644 B1 | 9/2002 | Olson et al. | |
| 2001/0012496 A1 | 8/2001 | Agapiou et al. | |

FOREIGN PATENT DOCUMENTS

| | | |
|---|---|---|
| EP | 0803519 A1 | 10/1997 |
| EP | 1099715 A1 | 5/2001 |
| WO | WO 94/28032 | 12/1994 |
| WO | WO 96/18661 | 6/1996 |
| WO | WO 99/61486 | 12/1999 |
| WO | WO 00/07714 | 2/2000 |

* cited by examiner

*Primary Examiner*—William K Cheung
(74) *Attorney, Agent, or Firm*—Conley Rose, P.C.; Rodney B. Carroll; Daniel E. Burke

(57) ABSTRACT

Disclosed herein is a method of operating a polymerization reactor for a polymerization reaction comprising modifying a recycle gas composition to increase the heat capacity of the recycle gas wherein the recycle gas composition is modified by reducing or eliminating the nitrogen concentration in the recycle gas. In an embodiment, the nitrogen concentration is reduced or eliminated by reducing or eliminating one or more nitrogen input sources to the polymerization reactor and replacing the nitrogen with an alternate inert fluid (a gas or liquid that is inert to the catalyst and reactants). The alternate inert fluid has a higher heat capacity and a higher molecular weight than nitrogen. In an embodiment, the nitrogen utilized to convey a catalyst into the polymerization reactor is replaced with an alternate inert fluid. In an embodiment, the alternate inert fluid is ethane, propane, isobutane, or combinations thereof.

47 Claims, 3 Drawing Sheets ate. Additionally,
METHOD FOR OPERATING A GAS PHASE POLYMERIZATION REACTOR

CROSS-REFERENCE TO RELATED APPLICATIONS

None

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

This invention generally relates to the field of gas phase polymerization reactions. More specifically, the present invention relates to increasing the rate at which the heat of reaction generated by a polymerization reaction can be removed to improve production capacities for gas phase polymerization reactions.

BACKGROUND OF THE INVENTION

Gas phase polymerizations for the production of polyolefins are typically carried out in fluidized bed reactors. The polymerization reaction is an exothermic process, making it important in the overall process to remove the generated heat of reaction to keep the operating temperature of the reactor below crucial temperatures such as the resin and catalyst degradation temperatures as well as temperatures which cause polymers to fuse and plug the reactor. Therefore, the amount of polymer that can be produced in a fluidized bed reactor of a given size in a specified time period is directly related to the amount of heat that can be withdrawn from the fluidized bed. Alternatively stated, the rate at which the heat of the polymerization reaction can be removed is a capacity limitation of gas phase polymerization reactors.

Operating a gas phase polymerization reactor in a condensation mode, where a recycle gas stream is cooled to a temperature below the dew point of the recycle gas stream to form a mixture comprising a liquid phase and a gas phase, is a typical way to remove the heat of the polymerization reaction. This mixture comprising the liquid phase and the gas phase is recycled back to the reactor and injected into the fluidized bed.

In a process utilizing condensing mode operation, the gas-liquid ratio should be maintained at a level sufficiently high to keep the liquid phase entrained in the gas phase of the recycle stream fed to the reactor. However, an excessive amount of condensation can lead to liquid pooling in the bottom head of the reactor. This liquid pooling can lead to fluidized bed instability problems. Furthermore, in a process utilizing condensing mode operation at high levels of condensation, undesirably high levels of liquid phase can exist in the lower sections of the fluidized bed. This can lead to liquid entrainment out of the reactor along with the product during a product discharge event. This liquid entrainment can reduce the fill efficiency of the product discharge system and increase the load on downstream vapor recovery systems. Also, if the condensed liquid is separated from the recycle gas and fed into the reactor through nozzles, the capacity of the liquid pump and liquid injection nozzle may become a limitation.

During the summer months, the warmer ambient temperatures can adversely affect production rates by making it more difficult to cool the recycle to a temperature below the dew point of the recycle if an upper limit on the condensable component concentration is established. Additionally, increasing the concentration of the condensable component, e.g., isopentane, can increase the molecular weight of the recycle gas, thus increasing the energy consumption of the recycle gas compressor. Furthermore, high levels of isopentane may cause undue resin stickiness. Therefore, there is a need in the polymer industry for alternative methods of operation to increase production rates from polymerization reactions other than by continuing to increase the amount of condensable component in the recycle gas, especially during the warmer months of the year, which may improve overall process economics at other times of the year as well.

SUMMARY OF THE INVENTION

Disclosed herein is a method of operating a polymerization reactor for a polymerization reaction comprising modifying a recycle gas composition to increase the heat capacity of the recycle gas wherein the recycle gas composition is modified by reducing or eliminating the nitrogen concentration in the recycle gas. In an embodiment, the nitrogen concentration is reduced or eliminated by reducing or eliminating one or more nitrogen input sources to the polymerization reactor and replacing the nitrogen with an alternate inert fluid (a gas or liquid that is inert to the catalyst and reactants). The alternate inert fluid has a higher heat capacity and a higher molecular weight than nitrogen. The higher heat capacity and higher molecular weight of the alternate inert fluid increases the polymerization rate of heat removal, which allows increased production capacity of the polymerization reactor. In an embodiment, the nitrogen utilized to convey a catalyst into the polymerization reactor is replaced with an alternate inert fluid. In an embodiment, the nitrogen in make-up fed to the reactor inlet line is replaced with an alternate inert fluid. In an embodiment, the nitrogen utilized to provide a blanket for the stored catalyst is replaced with an alternate inert fluid. In an embodiment, the nitrogen utilized as flush gas to flow through instrument taps in the reactor is replaced with an alternate inert fluid. In an embodiment, the alternate inert fluid is ethane, propane, isobutane, or combinations thereof. Furthermore, in an embodiment an about constant condensate content in a gas phase polymerization reactor inlet stream is maintained by adjusting a condensable inert fluid concentration in the polymerization reactor. In an embodiment, the condensable inert fluid is isopentane. In an embodiment the about constant condensate content in the reactor inlet stream is maintained at less than or equal to about 17.4 weight percent based on total weight of the reactor inlet stream.

Also disclosed is a method of maintaining about constant condensate content in a reactor inlet stream to a gas phase fluidized bed polymerization reactor comprising reducing or replacing nitrogen with an alternate inert fluid of higher molecular weight and higher heat capacity than that of nitrogen. The desired about constant condensate content in the reactor inlet stream may be maintained by adjusting isopentane concentration in the polymerization reactor. In an embodiment, the about constant condensate content in the reactor inlet stream is maintained at less than or equal to about 17.4% based on total weight of the reactor inlet stream.

Further disclosed herein is a method of controlling the rate of heat removal in a gas phase fluidized bed polymerization reactor comprising: selecting an alternate inert fluid to replace or reduce the amount of nitrogen fed into the polymerization reactor; and maintaining an about constant condensate content in a reactor inlet stream to the polymerization reactor.

Further disclosed is a method of increasing production rates in a gas phase fluidized bed polymerization reactor comprising: selecting an alternate inert fluid to replace or reduce the amount of nitrogen fed into the polymerization reactor; and maintaining an about constant condensate content in a reactor inlet stream to the polymerization reactor.

Further disclosed is a method of increasing the rate of heat removal in a gas phase fluidized bed polymerization reactor comprising increasing the heat capacity and molecular weight of a catalyst conveying alternate inert fluid while maintaining about a constant condensate content in the reactor inlet stream to the polymerization reactor.

Further disclosed is a method of reducing the amount of nitrogen build-up in a gas phase fluidized bed polymerization reactor comprising reducing or eliminating the amount of nitrogen used to convey catalyst into the polymerization reactor while maintaining about a constant condensate content in a reactor inlet stream to the polymerization reactor.

DETAILED DESCRIPTION

Figure 1:
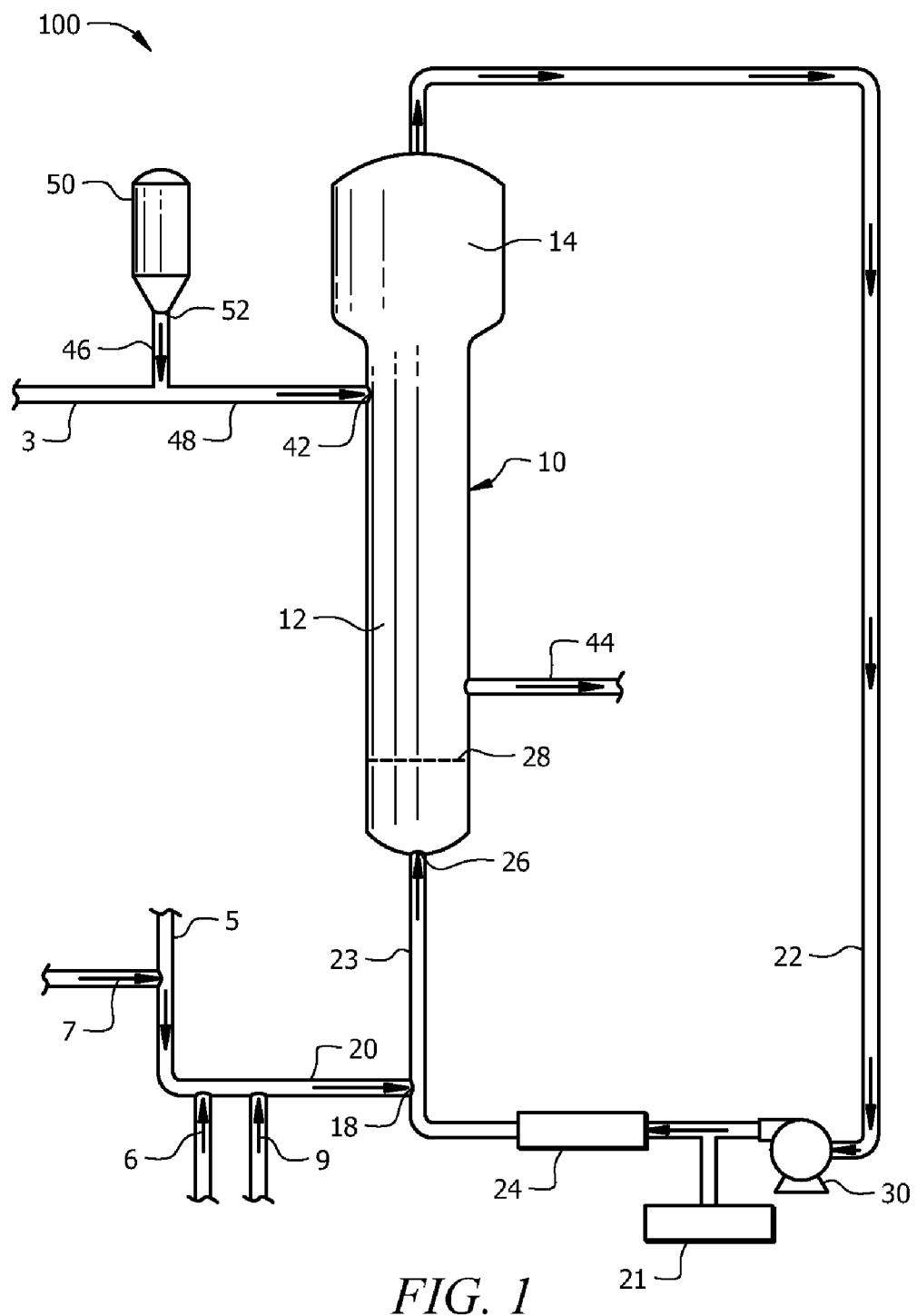
FIG. 1 is a process flow schematic of a gas phase polymerization system.

FIG. 1 depicts a polymerization system 100 to increase both the rate of heat removal and production rates from a polymerization reaction comprising modifying a recycle gas composition to increase the heat capacity of the recycle gas. In FIG. 1, the recycle gas composition is modified by utilizing an alternate inert fluid, selected on the basis of having a higher heat capacity and a higher molecular weight than nitrogen, for conveying a catalyst into a polymerization reactor, and maintaining an about constant condensate content in the reactor's inlet stream. The polymerization system 100 comprises a polymerization reactor 10, configured to receive and combine olefins and catalyst under polymerization conditions to produce polyolefins. Polymerization reactor 10 is coupled to a recycle line 22/reactor inlet line 23 for cooling of a reaction zone 12 disposed in polymerization reactor 10. Polymerization system 100 further comprises a compressor 30 coupled to a heat exchanger 24 and a make-up line 20, all of which are in fluid communication with polymerization reactor 10 via connections within recycle line 22/reactor inlet line 23. The polymerization system 100 further comprises a catalyst conveying line 48 coupled to the polymerization reactor 10 for conveying catalyst into the polymerization reactor 10.

The polymerization process is a fluidized bed process for producing polyolefins wherein a gaseous stream containing one or more olefins is continuously passed through a reaction zone under reactive conditions and in the presence of catalyst at a velocity sufficient to maintain the bed of solid particles in a suspended condition. Catalyst is conveyed into the reactor via an inert fluid. The gaseous stream containing unreacted gaseous olefin is continuously withdrawn from the reactor, compressed, cooled, and recycled into the reactor. Product is withdrawn from the reactor and make-up feed is added to the recycle stream.

In an embodiment, the polymerization reactor 10 may be operated in a condensation mode wherein the recycle gas stream is cooled to a temperature below the dew point of the recycle gas stream to form a mixture comprising a liquid phase and a gas phase, and which may also contain a minor amount of carried over solid polymer particles. In an embodiment, operation in condensation mode is carried out according to the method and apparatus in the U.S. Pat. No. 4,588,790, entitled "Method for Fluidized Bed Polymerization", filed on May 18, 1986, incorporated by reference herein in its entirety. Embodiments of the present disclosure may also follow the practices found in other prior patents disclosing condensing mode polymerization operations such as in U.S. Pat. Nos. 4,543,399, 5,436,304, 5,462,999, 6,391,985, 5,352,749, 5,405,922, 6,455,644, and European Patent no. 0,803,519 A1, all incorporated by reference herein in their entirety.

The polymerization reactor 10 in FIG. 1 is a continuous gas phase fluidized bed polymerization reactor, comprising a reaction zone 12 and a velocity reduction zone. 14. While a reactor configuration comprising a generally cylindrical region encompassing the fluidized bed beneath an expanded section is shown in FIG. 1, alternative suitable reactor configurations may also be utilized.

The reaction zone 12 comprises a bed of solid particles comprising growing polymer particles, formed polymer particles, and a minor amount of catalyst particles all fluidized by the continuous flow of polymerizable and modifying gaseous components, including inert fluid, make-up feed, and recycle fluid. To maintain a viable fluidized bed, the superficial gas velocity through the bed should desirably exceed the minimum flow required for fluidization. Fluidization may be achieved by a high rate of fluid recycle to and through the bed, typically on the order of about 50 times the rate of feed or make-up fluid. This high rate of recycle provides the requisite superficial gas velocity necessary to maintain the fluidized bed. The fluidized bed has the general appearance of a dense mass of individually moving particles as created by the percolation of gas through the bed. There may also be an upper limit on the gas velocity through the bed, as determined by the entrainment of solid particles out the top of the reactor at high gas velocities.

The fluid bed reactor is operated at a temperature below the sintering temperature of the polymer particles to ensure that sintering will not occur. The sintering temperature is a function of resin density. Accordingly, in an embodiment, temperatures of from about 75° C. to about 95° C. may be used to prepare ethylene copolymers having a density of from about 0.91 g/cm$^3$ to about 0.95 g/cm$^3$, while temperatures of from about 90° C. to about 115° C. may be used to prepare ethylene copolymers or homopolymers having a density of from about 0.95 g/cm$^3$ to about 0.97 g/cm$^3$, as disclosed in U.S. Pat. No. 4,427,573, filed on Jan. 24, 1984, entitled, "Polymerization catalyst, process for preparing, and use for ethylene polymerization", incorporated herein for reference in its entirety.

The fluid bed reactor is typically operated at pressures of up to about 1,000 psig. For polyolefin resin production, the reactor is desirably operated at a pressure of from about 250 to about 500 psig, and most desirably at a pressure of about 300 psig, with operation at the higher pressures in such ranges being favorable since higher heat transfer is experienced due to an increase in the unit volume heat capacity of the gas as the pressure is increased.

Feed to the polymerization reactor 10, herein referred to as make-up fluid (e.g., fresh monomer and comonomer) is fed to the reactor via make-up line 20. The make-up line 20 is coupled to recycle line 22 at point 18, and the make-up fluid and recycled components are fed into polymerization reactor 10 via the reactor inlet line 23. The composition of the recycle line 22 is typically measured by a gas analyzer 21 and the composition and amount of the make-up stream is then adjusted accordingly to maintain an essentially steady state gaseous composition within the reaction zone. In an embodiment, gas analyzer 21 is used to control the amounts of monomer and comonomers, as well as an amount of a condensable inert fluid (e.g., isopentane) to maintain an about constant condensate content (to be discussed in more detail later). The gas analyzer 21 can be positioned to receive gas from a point between the velocity reduction zone 14 and heat exchanger 24, preferably, between compressor 30 and heat exchanger 24.

Other feed components to the polymerization reactor 10 may include cocatalysts (e.g. organometallic compounds such as tri-ethyl aluminum or tri-ethyl boron), catalyst modifiers (e.g. an electron donor), antistatic compounds (e.g. Stadis 450), or combinations thereof, diluted in a suitable diluent such as hexane, heptane, or isobutane. The concentration of these components in the reactor may typically be small and thus their contribution to the recycle gas heat capacity and amount of condensation may be considered insignificant. Another feed component may be an inert fluid such as nitrogen for reactor pressure control. This inert fluid enters polymerization system 100 via line 6 and feeds into line 20 along with the monomer, comonomer, and condensable inert fluid. This inert fluid feed may be separate from and in addition to the inert fluid used to feed the catalyst through line 3.

Olefins, for example alphaolefins comprising monomer and optionally one or more comonomer, enter the polymerization system 100 via monomer line 5 and comonomer line 7. The combined olefins are then passed into make-up line 20 and on into polymerization reactor 10 as described above. Examples of suitable monomers and comonomers for this disclosure comprise ethylene, propylene, 1-butene, 1-hexene, 1-octene, 1-decene, or any combination thereof. In an embodiment, ethylene is fed into the polymerization system 100 via monomer line 5 and 1-hexene is fed in via comonomer line 7.

To ensure complete fluidization and conversion of the monomer and comonomer, the recycle stream and, where desired, at least part of the make-up stream are returned through reactor inlet line 23 to the reactor at point 26 below the bed. A gas distributor plate 28 may be located above the point of return to aid in fluidizing the bed uniformly and to support the solid particles prior to start-up or when the system is shut down. The stream passing upwardly through and out of the bed removes the heat of reaction generated by the exothermic polymerization reaction.

The portion of the gaseous stream flowing through the fluidized bed which did not react in the bed becomes the recycle stream which leaves the reaction zone 12 and passes into the velocity reduction zone 14 above the bed where a major portion of the entrained particles drop back onto the bed thereby reducing solid particle carryover.

Any suitable configuration for operating polymerization system 100 in a condensation mode may be used in this disclosure. In an embodiment, the recycle stream exits the velocity reduction zone 14 of polymerization reactor 10 via line 22, may then be compressed in compressor 30, and passed through heat exchanger 24 where the heat of reaction may be removed from the recycle stream before it is returned to the bed, as illustrated in FIG. 1. Alternatively, heat exchanger 24 may be located upstream of compressor 30 (not shown in FIG. 1). In another embodiment, two heat exchangers may be located in the recycle line, one upstream and one downstream of the compressor (not shown in FIG. 1). The recycle stream exiting the heat exchanger 24 is then returned to the polymerization reactor 10 at its base 26 via line 23 and thence to the fluidized bed through gas distributor plate 28. In an embodiment, a liquid separator may be located after the heat exchanger 24, in order to separate the gas phase from the liquid phase of the recycle stream, as in PCT International Publication No. WO 94/28032, incorporated herein in its entirety for reference, and the liquid phase may be injected into the reactor separate from the gas phase.

Particulate polyolefin product is discharged from line 44. Although not shown, it is desirable to separate any fluid from the product and to return the fluid to the polymerization reactor 10. Under a given set of operating conditions, the fluidized bed is maintained at essentially a constant height by withdrawing a portion of the bed as product via outlet line 44 at a rate essentially equivalent to the rate of formation of the particulate polyolefin product.

In FIG. 1, solid catalyst particles are released by a catalyst valve 52 into catalyst conveying line 48 from catalyst hopper 50 and are conveyed through line 48 via flow of an alternate inert fluid that enters the polymerization system 100 via line 3. Although not shown in FIG. 1, reactor feed streams are typically purified before being fed into the reactor, to remove any undesirable impurities or catalyst poisons such as water, sulfur compounds, oxygen, or oxygenated compounds, e.g., alcohols. In an embodiment, the alternate inert fluid from line 3 enters a purification system prior to contacting any catalyst in catalyst conveying line 48. Additionally, since most of the catalysts used are often sensitive to oxygen, the catalyst used to produce polymer in the fluidized bed is desirably stored in catalyst hopper 50 under a blanket of a fluid that is inert to the stored material, such as nitrogen, argon, or other inert fluid.

In an embodiment, catalyst valve 52 comprising a rotating cup (not shown) may be utilized to release the solid catalyst particles into catalyst conveying line 48. The cup may be rotated into a position where the top of the cup is facing up into the feed hopper such that the cup may be filled with catalyst. The cup then is rotated by 180 degrees, dumping the catalyst out into to the catalyst conveying line 48. The number of turns per minute of the catalyst valve 52 determines the catalyst feed rate. The catalyst feed rate may be adjusted based on a desired production rate. The catalyst is conveyed through catalyst conveying line 48 and into the polymerization reactor 10 at inlet 42, which is above distributor plate 28. The catalyst can be introduced continuously or intermittently into the reaction zone 14 at a desired rate at inlet 42 to maintain the desired average catalyst feed rate. Conventional metering valves or pumps (not shown in FIG. 1) can be used to deliver a desired flow of the catalyst to the reaction zone 12.

Catalyst is conveyed in line 48 by the alternate inert fluid into the polymerization reactor 10 at a point that may be located in the upper portion of the fluidized bed to provide uniform distribution and to minimize catalyst carryover into the recycle line 22. Carryover of catalyst into the recycle line 22 can result in polymerization occurring outside the reactor reaction zone 14 which can cause plugging of the recycle line 22 and fouling in the heat exchanger 24.

The catalyst and alternate inert fluid used to convey the catalyst into the reactor may be introduced into the reaction zone at any suitable temperature, for example ambient temperature. The catalyst is stored in catalyst hopper 50 and maintained at a pressure above the polymerization reactor 10 pressure, for example, about 100 psig higher than the reactor pressure, such that when a flow valve in catalyst conveying line 48 (not shown in FIG. 1) is opened, the catalyst will flow into the polymerization reactor 10, rather than reactor fluid flowing into the catalyst conveying line 48.

The catalyst can be conveyed into polymerization reactor 10 as described above or by any suitable technique utilizing an alternate inert fluid for conveying the catalyst. In some embodiments, for example ethylene polymerization, it may be desirable to continuously feed the catalyst into the reactor utilizing a catalyst feeder as disclosed, for example, in U.S. Pat. No. 4,628,034 entitled "Control of a Polymerization Reaction" or alternatively as disclosed in PCT International Publication No. WO 99/61486 entitled "Catalyst Delivery Method and Catalyst Feeder" both incorporated by reference herein in their entirety.

The catalyst used for the olefin polymerization can be a transition metal catalyst and may include a conventional Ziegler-Natta catalyst, a chromium based catalyst, a metallocene catalyst, a vanadium based catalyst, and nickel based catalyst, or a combination thereof. In an embodiment, the catalyst is a Ziegler-Natta catalyst, the monomer is ethylene, and the comonomer is 1-hexene. Traditional Ziegler-Natta catalysts typically comprise a transition metal halide, such as titanium or vanadium halide and an organometallic compound such as trialkylaluminum, serving as an activator for the transition metal halide. Typically, most gas phase reactors transfer the catalyst as a dry solid in a gas stream to the reactor. However, a catalyst slurry, suspended in liquid hydrocarbon, could be used with the method of this disclosure, in an alternative embodiment.

In an embodiment, it may be desirable to operate a polymerization reactor for a polymerization reaction comprising modifying a recycle gas composition to increase the heat capacity of the recycle gas by reducing or eliminating the nitrogen concentration in the recycle gas. By reducing or eliminating one or more nitrogen input sources to the polymerization reactor and replacing the nitrogen with an alternate inert fluid having a higher heat capacity and a higher molecular weight than nitrogen, the nitrogen concentration may be reduced or eliminated as desired and the heat capacity of the recycle gas subsequently increased. The alternate inert fluid may be a gas or a liquid that is inert to the catalyst and reactants. If the selected alternate inert fluid is a liquid, the liquid selected should volatilize under the operating conditions of the polymerization reactor.

In an embodiment, the nitrogen typically utilized to convey a catalyst into the polymerization reactor may be replaced with an alternate inert fluid. In this embodiment the nitrogen fed to stream 3 of FIG. 1 is replaced with an alternate inert fluid. In an alternate embodiment, the nitrogen typically utilized to provide a blanket for the stored catalyst may be replaced with an alternate inert fluid. This nitrogen source is not illustrated in FIG. 1, but would typically be fed to the top of the catalyst hopper 50. The make up rate may be typically controlled using a pressure controller and pressure control valve such that constant pressure is maintained in the catalyst hopper 50. The nitrogen replaces catalyst leaving the hopper and fed to the reactor. In an alternate embodiment, nitrogen in line 6 fed to polymerization system 100 via make-up line 20 may be replaced with an alternate inert fluid. This make-up fluid may be used to maintain a constant reactor pressure. Additionally, in an embodiment, the nitrogen typically utilized as a flush gas to flow through instrument taps in the reactor and keep them clean of any solids may be replaced with an alternate inert fluid (not illustrated in FIG. 1). In each embodiment, the alternate inert fluid may later become part of the recycle stream to be cooled and can affect the dew point of the recycle. Suitable nitrogen replacement alternate inert fluids include, for example, ethane, propane, isobutane, or a combination thereof.

In an embodiment, an alternate inert fluid having a higher heat capacity and a higher molecular weight than that of nitrogen, may be selected to replace the nitrogen in any of the nitrogen sources to polymerization system 100, thereby modifying the composition of the recycle stream. In an embodiment, the alternate inert fluid is ethane, which does not condense at polymerization system 100 operating temperatures and pressures. In another embodiment the alternate inert fluid is propane. In yet another embodiment the alternate inert fluid is isobutane. Selection of an alternate inert fluid with a higher heat capacity and a higher molecular weight than nitrogen increases the rate of heat removal from the polymerization reactor 10 as compared to a process using nitrogen as the alternate inert fluid. Selection of an alternate inert fluid composition to reduce or eliminate the amount of nitrogen in any feed source into polymerization reactor 10 reduces the amount of nitrogen build-up in the gas phase fluidized bed polymerization reactor, thereby increasing the rate of heat removal. Additionally, increasing the rate of heat removal from the polymerization reactor 10 likewise increases the production rate of polyolefin product from the polymerization reactor 10.

In an embodiment for processing polyolefin from monomer and comonomer, which utilizes an alternate inert fluid with a higher heat capacity and a higher molecular weight than nitrogen to replace nitrogen in the recycle stream to the polymerization system 10, the rate of heat removal is increased as compared to a process that did not replace any nitrogen in the recycle stream. The production rate capacity of the polymerization reaction is also increased. In an embodiment, the rate of heat removal is increased by greater than or equal to about 5%, alternatively greater than or equal to about 10%, alternatively greater than or equal to about 15%, alternatively greater than or equal to about 20%, alternatively greater than or equal to about 25%, alternatively greater than or equal to about 30%, alternatively greater than or equal to about 35%, alternatively greater than or equal to about 40%, and alternatively greater than or equal to about 45%, and alternatively at increments there between, as compared to the same process that did not replace any nitrogen in the recycle stream. In an embodiment, the production rate is increased by greater than or equal to about 5%, alternatively greater than or equal to about 10%, alternatively greater than or equal to about 15%, alternatively greater than or equal to about 20%, alternatively greater than or equal to about 25%, alternatively greater than or equal to about 30%, alternatively greater than or equal to about 35%, alternatively greater than or equal to about 40%, and alternatively greater than or equal to about 45%, and alternatively at increments there between, as compared to the same process that did not replace any nitrogen in the recycle stream.

In an embodiment for processing polyethylene from ethylene and 1-hexene, which utilizes ethane as the alternate inert fluid to replace nitrogen in the recycle stream to the polymerization system 10, the rate of heat removal is increased as compared to a process that did not replace any nitrogen in the recycle stream. The production rate capacity of the polymerization reaction is also increased. In an embodiment, the rate of heat removal is increased by greater than or equal to about 5%, alternatively greater than or equal to about 10%, alternatively greater than or equal to about 15%, alternatively greater than or equal to about 20%, and alternatively greater than or equal to about 25%, and alternatively at increments there between, as compared to the same process that did not replace any nitrogen in the recycle stream. In an embodiment, the production rate is increased by greater than or equal to about 5%, alternatively greater than or equal to about 10%, alternatively greater than or equal to about 15%, alternatively greater than or equal to about 20%, and alternatively greater than or equal to about 25%, and alternatively at increments there between, as compared to the same process that did not replace any nitrogen in the recycle stream. In an embodiment, the rate of heat removal increase is greater than or equal to about 25%, the production rate increase is greater than or equal to about 25%, the fluidization gas velocity, reactor temperature, reactor pressure, reactor inlet stream temperature, and weight percent condensate in the reactor inlet stream are constant at about 2.2 ft/s, about 210° F., about 315 psia, about 110° F., and about 17.4 weight percent, respectively.

In an embodiment for processing polyethylene from ethylene and 1-hexene, which utilizes propane as the alternate inert fluid to replace nitrogen in the recycle stream to the polymerization system 100, the rate of heat removal is increased as compared to a process that did not replace any nitrogen in the recycle stream. The production rate capacity of the polymerization reaction is also increased. In an embodiment, the rate of heat removal is increased by greater than or equal to about 5%, alternatively greater than or equal to about 10%, alternatively greater than or equal to about 15%, alternatively greater than or equal to about 20%, alternatively greater than or equal to about 25%, alternatively greater than or equal to about 30%, alternatively greater than or equal to about 35%, alternatively greater than or equal to about 40%, and alternatively greater than or equal to about 45%, and alternatively at increments there between, as compared to the same process that did not replace any nitrogen in the recycle stream. In an embodiment, the production rate is increased by greater than or equal to about 5%, alternatively greater than or equal to about 10%, alternatively greater than or equal to about 15%, alternatively greater than or equal to about 20%, alternatively greater than or equal to about 25%, alternatively greater than or equal to about 30%, alternatively greater than or equal to about 35%, alternatively greater than or equal to about 40%, and alternatively greater than or equal to about 45%, and alternatively at increments there between, as compared to the same process that did not replace any nitrogen in the recycle stream. In an embodiment, the rate of heat removal increase is greater than or equal to about 45%, the production rate increase is greater than or equal to about 45%, the fluidization gas velocity, reactor temperature, reactor pressure, reactor inlet stream temperature, and weight percent condensate in the reactor inlet stream are constant at about 2.2 ft/s, about 210° F., about 315 psia, about 110° F., and about 17.4 weight percent, respectively.

In an embodiment for processing polyethylene from ethylene and 1-hexene, which utilizes isobutane as the alternate inert fluid to replace nitrogen in the recycle stream to the polymerization system 10, the rate of heat removal is increased as compared to a process that did not replace any nitrogen in the recycle stream. The production rate capacity of the polymerization reaction is also increased. In an embodiment, the rate of heat removal is increased by greater than or equal to about 5%, alternatively greater than or equal to about 10%, and alternatively greater than or equal to about 15%, and alternatively at increments there between, as compared to the same process that did not replace any nitrogen in the recycle stream. In an embodiment, the production rate is increased by greater than or equal to about 5%, alternatively greater than or equal to about 10%, and alternatively greater than or equal to about 15%, and alternatively at increments there between, as compared to the same process that did not replace any nitrogen in the recycle stream. In an embodiment, the rate of heat removal increase is greater than or equal to about 15%, the production rate increase is greater than or equal to about 15%, the fluidization gas velocity, reactor temperature, reactor pressure, reactor inlet stream temperature, and weight percent condensate in the reactor inlet stream are constant at about 2.2 ft/s, about 210° F., about 315 psia, about 110° F., and about 17.4 weight percent, respectively.

In an embodiment, it may be desirable to maintain an about constant condensate content in the reactor inlet line 23 to the polymerization reactor 10 in combination with selection of an alternate inert fluid having a heat capacity and molecular weight greater than nitrogen. The condensate content is a function of the dew point of the recycle gas stream. Adjustments to the condensate content can be made by adjusting the dew point of the recycle stream. The recycle stream dew point at constant operating pressure can be increased by increasing the concentration of condensable fluids in the recycle stream, and/or reducing the concentration of noncondensable gases in the recycle stream. In an embodiment, the dew point of the recycle stream is increased by the addition of a condensable fluid to the recycle stream that is inert to the catalyst, reactants, and the products of the polymerization reaction. The condensable fluid can be introduced into the recycle stream with makeup monomer(s) or by any other means or at any other point in the system. Examples of such condensable fluids are saturated hydrocarbons, such as butanes, pentanes or hexanes.

Therefore, by increasing the concentration of the condensable fluids the dew point of the recycle gas can be increased. However, in embodiments of this disclosure, when the nitrogen is replaced with the alternate inert fluid (e.g. ethane, propane, or isobutane) the concentration of the condensable fluid (e.g. isopentane) may also be reduced, in order to maintain a constant condensate content (as discussed below) in the reactor inlet line 23. The net result is that the recycle stream dew point is decreased, as shown in the examples below in Tables 1-3.

In a desirable embodiment, an about constant condensate content in reactor inlet line 23 may be maintained at less than or equal to about 17.4 weight percent and may be controlled by adjusting the isopentane concentration in the polymerization reactor 10. Generally, increasing the isopentane increases the amount of condensation for a constant temperature and pressure. Typically the isopentane concentration is established such that the recycle gas outlet temperature is reasonable, i.e., operation is not constrained by the cooling water temperature fed to the heat exchanger 24. Examples of using isopentane as a non-polymerizing material added to the recycle gas stream can also be found in U.S. Pat. Nos. 4,588, 790, 5,436,304, 5,462,999, 6,391,985, 5,352,749, and 5,405, 922, incorporated previously. Isopentane may commonly be used because its molecular weight is high enough to condense but is low enough that it can be removed from the polymer in subsequent downstream processing, e.g., degassing.

In FIG. 1, isopentane is fed into polymerization system 100 via line 9, the rate of which is determined by gas analyzer 21, as previously mentioned. The isopentane from line 9 may be combined with other make-up fluids from lines 5, 6, and 7 before being passed through make-up line 20, into reactor inlet line 23 at point 18, and on into polymerization reactor 10 via reactor inlet line 23.

In an embodiment, essentially all of the nitrogen in the recycle can be replaced with ethane without substantially increasing the amount of condensation because ethane does not condense at the typical gas phase polyethylene reactor operating conditions and therefore the isopentane concentration can remain relatively constant, and may not require adjustments. Embodiments utilizing isobutane or propane to replace nitrogen will increase the amount of condensation because isobutane and propane will also condense at the typical gas phase polyethylene reactor operating conditions. For these embodiments the isopentane concentration may be lowered as the isobutane or propane concentration are increased to maintain a constant condensate content in reactor inlet line 23.

In an embodiment, propane is selected to convey catalyst into polymerization reactor 10. In this embodiment, the isopentane concentration may be adjusted to maintain an about constant condensate content in reactor inlet line 23 according to the equations:

$$\text{propane} = -8.1886(\text{isopentane})^2 - 2.5998(\text{isopentane}) + 0.6882$$

$$Q/Q_{base} = -4.8879(\text{isopentane})^2 - 2.2436(\text{isopentane}) + 1.5259$$

wherein propane and isopentane are mole fractions, and $Q/Q_{base}$ is the relative heat removal capabilities, calculated by dividing the heat removal capability using propane (i.e., Q) by the heat removal capability using nitrogen (i.e., $Q_{base}$).

In another embodiment, isobutane is selected to convey catalyst into polymerization reactor 10. In this embodiment, the isopentane concentration may be adjusted to maintain an about constant condensate content in reactor inlet line 23 according to the equations:

$$\text{isobutane} = -1.3636(\text{isopentane})^2 - 1.9918(\text{isopentane}) + 0.3776$$

$$Q/Q_{base} = -0.8938(\text{isopentane})^2 - 1.3021(\text{isopentane}) + 1.2481$$

wherein isobutane and isopentane are mole fractions, and $Q/Q_{base}$ is the relative heat removal capabilities, calculated by dividing the heat removal capability using isobutane (i.e., Q) by the heat removal capability using nitrogen (i.e., $Q_{base}$).

EXAMPLES

The following examples are presented merely for the purpose of illustration and are not intended to limit in any manner the scope of the invention.

Example 1

The following examples were calculated using a process simulator (AspenPlus) for a polyethylene reaction. The examples illustrate the effect of replacing nitrogen with an alternate inert fluid having a higher heat capacity and higher molecular weight than nitrogen to enhance the heat removal capabilities and thereby allow higher production rates for a given reactor configuration. Examples of alternate inert fluids are listed in Table 1 below. The fluidization gas velocity, reactor temperature, reactor pressure, reactor inlet stream temperature, and weight percent condensate in the reactor inlet stream were all held constant at 2.2 ft/s, 210° F., 315 psia, 110° F., and 17.4 weight percent, respectively, and at a constant ethylene concentration of 0.35 mole fraction for all example cases.

A commercial steady state simulation software called Aspen Plus®, provided by Aspen Tech, was used to calculate the recycle gas heat removal capability for each example. The thermodynamic package chosen for the simulations was the Ping-Robinson equation of state with the Boston-Mathias modification. This thermodynamic package is available as a library method in Aspen Plus®. User input data for each example consisted of stream data, representing line 22 exiting the reactor, and state variables for an isothermal flash, representing heat exchanger 24. The specified stream data was line 22 temperature, pressure, and composition. The specified state variables for heat exchanger 24 were outlet temperature and pressure. In each case the isopentane concentration was adjusted such that 17.4 wt % condensate was obtained at the outlet of the heat exchanger 24. The nitrogen concentration was zero for the methane and ethane cases but varied for the propane and isobutane cases as can be seen in Tables 2 and 3. This is due to the fact that propane and isobutane contribute significantly to the amount of condensate at a given temperature and pressure. The relative heat removal capabilities, $Q/Q_{base}$, were calculated by dividing the heat removal capability using the alternate inert fluid (i.e., Q) by the heat removal capability using nitrogen (i.e., $Q_{base}$).

As is shown in Table 1, ethane increases the rate of heat removal by 26%, propane increases the rate of heat removal by 47%, and isobutane increases the rate of heat removal by 18% as compared to the nitrogen base case. Note methane does not offer an advantage over nitrogen, even though it has a higher heat capacity, because its molecular weight is lower than that of nitrogen. The benefit of replacing nitrogen with isobutane is less than that of propane because not all of the nitrogen can be removed from the system in the isobutane case. In the isobutane case 0.325 mole fraction nitrogen remained in the recycle gas at the maximum isobutane concentration.

Figure 2:
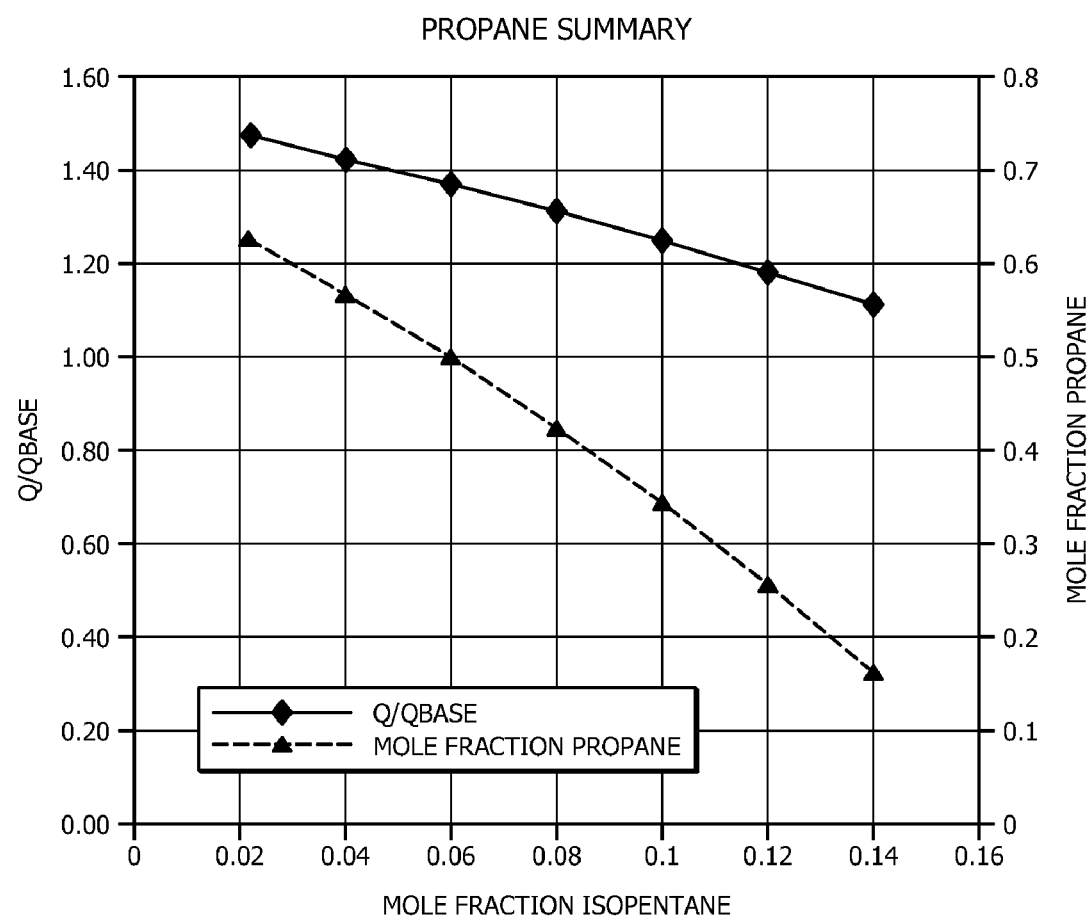
FIG. 2 is a graphical representation of a simulated gas phase polymerization system in which propane and isopentane are added to maintain a constant condensate content in a reactor inlet stream.
Figure 3:
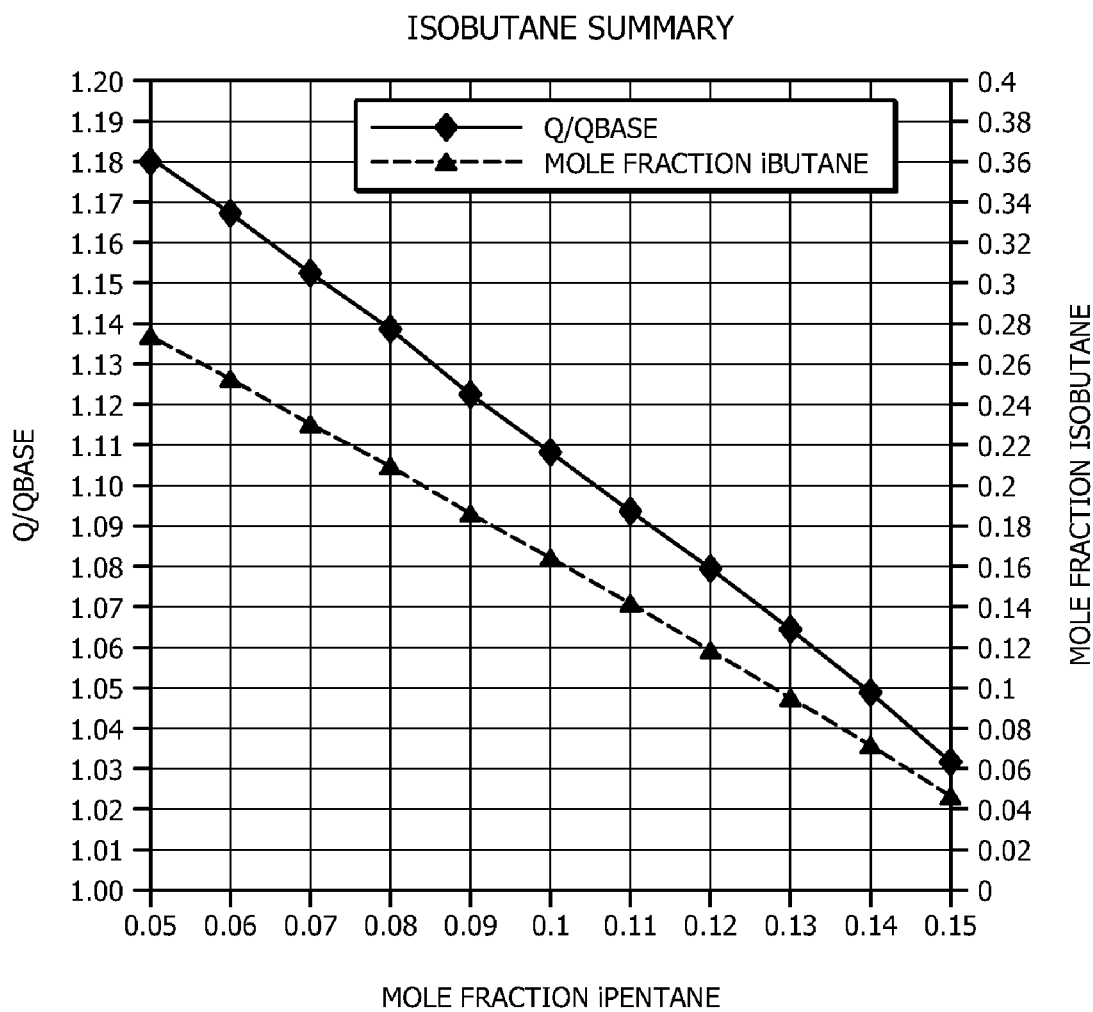
FIG. 3 is a graphical representation of a simulated gas phase polymerization system in which isobutane and isopentane are added to maintain a constant condensate content in a reactor inlet stream.

Because propane and isobutane also condense, the isopentane concentration was reduced as the propane or isobutane concentration was increased to maintain a constant condensate content. Table 2, below, contains the simulated data for the propane case, which is further graphically illustrated in FIG. 2. Table 3, below, contains the simulated data for the isobutane, case which is further graphically illustrated in FIG. 3. Regression of this data provides the following equations for the amount of isopentane added in each case as well as the relative heat removal capabilities for each case.

For the propane case $$\text{propane} = -8.1886(\text{isopentane})^2 - 2.5998(\text{isopentane}) + 0.6882$$

$$Q/Q_{base} = -4.8879(\text{isopentane})^2 - 2.2436(\text{isopentane}) + 1.5259$$

wherein propane and isopentane are mole fractions, and $Q/Q_{base}$ is the relative heat removal capabilities, calculated by dividing the heat removal capability using propane (i.e., Q) by the heat removal capability using nitrogen (i.e., $Q_{base}$). For the isobutane case:

$$\text{isobutane} = -1.3636(\text{isopentane})^2 - 1.9918(\text{isopentane}) + 0.3776$$

$$Q/Q_{base} = -0.8938(\text{isopentane})^2 - 1.3021(\text{isopentane}) + 1.2481$$

wherein isobutane and isopentane are mole fractions, and $Q/Q_{base}$ is the relative heat removal capabilities, calculated by dividing the heat removal capability using isobutane (i.e., Q) by the heat removal capability using nitrogen (i.e., $Q_{base}$).

TABLE 1

| Inert Fluid | Mole Fraction Nitrogen | Mole Fraction Alternate Inert Fluid | Mole Fraction Isopentane | Q, MMBtu/hr | Tdew, deg F. | Q/Qbase |
|---|---|---|---|---|---|---|
| Nitrogen | 0.48 | 0 | 0.17 | 129.1 | 144.6 | 1.00 |
| Methane | 0 | 0.492 | 0.158 | 128.7 | 138.6 | 1.00 |
| Ethane | 0 | 0.507 | 0.143 | 162.7 | 139.2 | 1.26 |
| Propane | 0 | 0.628 | 0.022 | 190.4 | 118.8 | 1.47 |
| Isobutane | 0.325 | 0.275 | 0.050 | 152.4 | 181.8 | 1.18 |

TABLE 2

| Mole Fraction Nitrogen | Mole Fraction Propane | Mole Fraction iPentane | Q, MMBtu/hr | Tdew, deg F. | Q/Qbase |
|---|---|---|---|---|---|
| 0.347 | 0.163 | 0.14 | 144.02 | 141.2 | 1.12 |
| 0.271 | 0.259 | 0.12 | 153.22 | 138.4 | 1.19 |
| 0.203 | 0.347 | 0.1 | 161.73 | 135.2 | 1.25 |
| 0.142 | 0.428 | 0.08 | 169.76 | 131.6 | 1.31 |
| 0.088 | 0.502 | 0.06 | 177.35 | 127.6 | 1.37 |
| 0.04 | 0.57 | 0.04 | 184.31 | 123.1 | 1.43 |
| 0 | 0.628 | 0.022 | 190.37 | 118.8 | 1.47 |

TABLE 3

| Mole Fraction Nitrogen | Mole Fraction iButane | Mole Fraction iPentane | Q, MMBtu/hr | Tdew, deg F. | Q/Qbase |
|---|---|---|---|---|---|
| 0.452 | 0.048 | 0.15 | 133.2 | 142.8 | 1.03 |
| 0.438 | 0.072 | 0.14 | 135.4 | 141.9 | 1.05 |
| 0.424 | 0.096 | 0.13 | 137.4 | 141 | 1.06 |
| 0.411 | 0.119 | 0.12 | 139.4 | 140 | 1.08 |
| 0.398 | 0.142 | 0.11 | 141.2 | 138.9 | 1.09 |
| 0.385 | 0.165 | 0.1 | 143.1 | 137.8 | 1.11 |
| 0.373 | 0.187 | 0.09 | 144.9 | 136.7 | 1.12 |
| 0.36 | 0.21 | 0.08 | 147 | 135.5 | 1.14 |
| 0.349 | 0.231 | 0.07 | 148.8 | 134.3 | 1.15 |
| 0.337 | 0.253 | 0.06 | 150.7 | 133.1 | 1.17 |
| 0.325 | 0.275 | 0.05 | 152.4 | 131.8 | 1.18 |

In the description above, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present disclosure is susceptible to embodiments of different forms. There are shown in the drawings, and herein are described in detail, specific embodiments of the present disclosure with the understanding that the present disclosure is to be considered an exemplification of the principles of the invention, and is not intended to limit the invention to that illustrated and described herein. It is to be fully recognized that the different teachings of the embodiments discussed above may be employed separately or in any suitable combination to produce desired results. Specifically, the method and system of the present invention disclosed herein to increase both the rate of heat removal and production rates from a polymerization reaction may be used with any suitable polymerization reaction wherein the reaction is exothermic. In a desirable embodiment, the method and system of the present disclosure is for a polymerization reaction for producing polyethylene from ethylene and 1-hexene utilizing ethane, propane, or isobutane as an alternate inert fluid rather than nitrogen. The detailed description above is focused on this embodiment but with the understanding that the present invention may have broader applications. Although only a few embodiments of the present invention have been described herein, it should be understood that the present disclosure may be embodied in many other specific forms without departing from the spirit or the scope of the present disclosure. Any examples included are to be considered as illustrative and not restrictive, and the disclosure is not to be limited to the details given herein, but may be modified within the scope of the appended claims along with their full scope of equivalents.

I claim:

1. A method of operating a gas phase fluidized bed polymerization reactor to produce a polymer product comprising: increasing a production rate of the same polymer product by modifying a composition of a recycle gas stream to the polymerization reactor to increase a heat capacity of the recycle gas stream while holding a condensate content of one or more inlet streams to the polymerization reactor at a value of less than or equal to about 17.4 weight percent, wherein modifying the recycle gas composition comprises adding an alternate inert fluid to the recycle gas and wherein the alternate inert fluid is non-condensable under reactor conditions.

2. The method of claim 1, wherein modifying the recycle gas composition further comprises reducing or eliminating nitrogen concentration in the recycle gas stream.

3. The method of claim 2, wherein reducing or eliminating nitrogen comprises:
reducing or eliminating one or more nitrogen input sources to the polymerization reactor; and
replacing the reduced or eliminated nitrogen with the alternate inert fluid.

4. The method of claim 3, wherein the polymerization reactor comprises one or more catalysts and one or more reactants, and wherein the alternate inert fluid is inert to the catalysts and the reactants.

5. The method of claim 3 wherein the nitrogen input source comprises nitrogen used to convey one or more catalysts into the polymerization reactor.

6. The method of claim 3 wherein the nitrogen input source comprises nitrogen present in a make-up gas stream fed to the polymerization reactor.

7. The method of claim 3 wherein the nitrogen input source comprises nitrogen used to blanket stored catalyst for use in the polymerization reactor.

8. The method of claim 3 wherein the nitrogen input source comprises nitrogen used to flush instruments taps in the polymerization reactor.

9. The method of claim 3, wherein the alternate inert fluid has a higher heat capacity and a higher molecular weight than nitrogen.

10. The method of claim 3, wherein the alternate inert fluid is ethane, propane, isobutane, or combinations thereof.

11. The method of claim 9, wherein the higher heat capacity and higher molecular weight of the alternate inert fluid increase heat removal from the polymerization reactor.

12. The method of claim 11, wherein the increased heat removal allows increased production capacity of the polymerization reactor.

13. The method of claim 1, wherein the polymerization reactor is a continuous, gas phase, fluidized catalyst bed, polymerization reactor.

14. The method of claim 13, wherein the catalyst is a polymerization catalyst comprising a chromium-based catalyst, a Ziegler-Natta catalyst, a metallocene catalyst, a vanadium based catalyst, a nickel based catalyst, or a combination thereof.

15. The method of claim 1, wherein the polymerization reaction polymerizes olefins into polyolefins.

16. The method of claim 1, wherein the polymerization reaction polymerizes a monomer and one or more comonomers into polyolefins.

17. The method of claim 16, wherein the monomer, comonomer, or both comprise alphaolefins.

18. The method of claim 16, wherein the monomer is ethylene, propylene, or combinations thereof.

19. The method of claim 16, wherein the one or more comonomers comprise propylene, 1-butene, 1-hexene, 1-octene, 1-decene, or combinations thereof.

20. The method of claim 1, wherein modifying the composition of the recycle gas stream increases heat removal from the polymerization reactor.

21. The method of claim 20, wherein the heat removal is increased by greater than about 5%.

22. The method of claim 20, wherein the heat removal is increased by greater than about 15%.

23. The method of claim 20, wherein the heat removal is increased by greater than about 25%.

24. The method of claim 20, wherein the heat removal is increased by greater than about 45%.

25. The method of claim 1, wherein increasing the heat capacity of the recycle gas stream increases production capacity of the polymerization reactor.

26. The method of claim 25, wherein the production capacity of the polymerization reactor is increased by greater than about 5%.

27. The method of claim 25, wherein the production capacity of the polymerization reactor is increased by greater than about 15%.

28. The method of claim 25, wherein the production capacity of the polymerization reactor is increased by greater than about 25%.

29. The method of claim 25, wherein the production capacity of the polymerization reactor is increased by greater than about 45%.

30. The method of claim 1, further comprising:
reducing or eliminating one or more nitrogen input sources to the polymerization reactor; and
replacing the reduced or eliminated nitrogen with an alternate inert fluid, wherein the alternate inert fluid is propane.

31. The method of claim 30, wherein isopentane concentration is adjusted to maintain the condensate content as calculated by the equations:

$$propane = -8.1886(isopentane)^2 - 2.5998(isopentane) + 0.6882$$

$$Q/Q_{base} = -4.8879(isopentane)^2 - 2.2436(isopentane) + 1.5259$$

wherein propane is a mole fraction between about 0.057 and 0.074 and isopentane is a mole fraction between about 0.022 and 0.14, and $Q/Q_{base}$ is the relative production capacities, calculated by dividing the production capability of a polymerization process replacing at least a portion of the nitrogen in the recycle stream with propane (Q) by the production capability of a polymerization process without replacing at least a portion of the nitrogen in the recycle stream with propane ($Q_{base}$).

32. The method of claim 1, further comprising:
reducing or eliminating one or more nitrogen input sources to the polymerization reactor; and
replacing the reduced or eliminated nitrogen with an alternate inert fluid, wherein the alternate inert fluid is isobutane.

33. The method of claim 32, wherein isopentane concentration is adjusted to maintain the condensate content as calculated by the equations:

$$isobutane = -1.3636(isopentane)^2 - 1.9918(isopentane) + 0.3776$$

$$Q/Q_{base} = -0.8938(isopentane)^2 - 1.3021(isopentane) + 1.2481$$

wherein isobutane is a mole fraction between about 0.048 and 0.275 and isopentane is a mole fraction between about 0.05 and 0.15, and $Q/Q_{base}$ is the relative production capacities, calculated by dividing the production capability of a polymerization process replacing at least a portion of the nitrogen in the recycle stream with isobutane by the production capability of a polymerization process without replacing at least a portion of the nitrogen in the recycle stream with isobutane.

34. A method of operating a gas phase fluidized bed polymerization reactor to produce a polymer product comprising:
increasing a production rate of the same polymer product by replacing all or a portion of nitrogen fed into the reactor with an alternate inert fluid having a higher molecular weight and higher heat capacity than nitrogen while holding a condensate content of one or more inlet streams to the reactor at a value of less than or equal to about 17.4 weight percent, wherein the alternate inert fluid is noncondensable under reactor conditions.

35. The method of claim 34 further comprising adjusting isopentane concentration in the polymerization reactor to maintain the condensate content in one or more inlet streams.

36. A method of controlling heat removal in a gas phase fluidized bed polymerization reactor to produce a polymer product comprising:
operating the reactor at a first steady state polymer production rate to produce the polymer product;
increasing production of the same polymer product to a second steady state rate by replacing all or a portion of nitrogen fed into the reactor with an alternate inert fluid having a higher molecular weight and higher heat capacity than nitrogen, wherein the alternate inert fluid is noncondensable under reactor conditions; and
maintaining a condensate content in one or more inlet streams to the polymerization reactor at a value of less than or equal to 17.4 weight percent during the first and second steady state polymer production rates.

37. The method of claim 36, wherein the alternate inert fluid is selected based on the molecular weight and heat capacity of the alternate inert fluid relative to nitrogen.

38. The method of claim 37, wherein the alternate inert fluid has a higher molecular weight and a higher heat capacity than nitrogen.

39. The method of claim 36, wherein the alternate inert fluid is ethane, propane, isobutane, or a combination thereof.

40. The method of claim 36, wherein the replacing all or a portion of the nitrogen increases the heat removal from the polymerization reactor.

41. The method of claim 40, wherein the heat removal is increased by greater than about 5%.

42. The method of claim 40, wherein the heat removal is increased by greater than about 15%.

43. The method of claim 40, wherein the heat removal is increased by greater than about 25%.

44. The method of claim 40, wherein the heat removal is increased by greater than about 45%.

45. A method of increasing production in a gas phase fluidized bed polymerization reactor to produce a polymer product comprising:
selecting an alternate inert fluid and replacing all or a portion of nitrogen fed into the polymerization reactor with the alternate inert fluid, wherein the alternate inert fluid is noncondensable under reactor conditions; and
maintaining a condensate content of less than or equal to 17.4 weight percent in one or more reactor inlet streams to the polymerization reactor, wherein the production rate of the same polymer product after replacing all or a portion of the nitrogen is greater than before replacing all or a portion of the nitrogen.

46. A method of increasing heat removal from a gas phase fluidized bed polymerization reactor to produce a polymer product comprising increasing heat capacity and molecular weight of a fluid used to convey catalyst to the polymerization reactor while increasing the production rate of the same polymer product and maintaining a condensate content of less than or equal to 17.4 weight percent in one or more inlet streams to the polymerization reactor, wherein the fluid is noncondensable under reactor conditions.

47. A method of reducing the amount of nitrogen build-up in a gas phase fluidized bed polymerization reactor to produce a polymer product comprising reducing or eliminating the amount of nitrogen used to convey catalyst into the polymerization reactor while increasing the production rate of the same polymer product and maintaining a condensate content of less than or equal to 17.4 weight percent in one or more inlet streams to the polymerization reactor, wherein the fluid is noncondensable under reactor conditions.

* * * * *